United States Patent [19]

Cirkel et al.

[11] Patent Number: 4,573,160
[45] Date of Patent: Feb. 25, 1986

[54] EXCITATION CIRCUIT FOR A TE HIGH-ENERGY LASER SYSTEM

[75] Inventors: Hans-Jürgen Cirkel; Willi Bette; Reinhard Müller, all of Erlangen, Fed. Rep. of Germany

[73] Assignee: Kraftwerk Union Aktiengesellschaft, Mulheim an der Ruhr, Fed. Rep. of Germany

[21] Appl. No.: 626,456

[22] Filed: Jun. 29, 1984

[30] Foreign Application Priority Data

Jun. 30, 1983 [DE] Fed. Rep. of Germany ....... 3323614

[51] Int. Cl.$^4$ ............................................. H01S 3/00
[52] U.S. Cl. ...................................... 372/38; 372/83; 372/87
[58] Field of Search ..................... 372/87, 38, 83, 81

[56] References Cited

U.S. PATENT DOCUMENTS 4,365,337 12/1982 Cirkel et al. .................... 372/87
4,521,889 6/1985 Cirkel et al. .................... 372/87

Primary Examiner—Léon Scott, Jr.
Attorney, Agent, or Firm—Herbert L. Lerner; Laurence A. Greenberg

[57] ABSTRACT

An excitation circuit for a TE high-energy laser system, includes at least one high-speed, high-voltage switch, activatable for energizing a pulse-generating network to generate high-voltage pulses at a pair of laser electrodes; the pulse generating network having first and second strip-line capacitors associated with the high-voltage switch and the laser chamber and with appertaining equivalent inductances of the excitation circuit formed from self-inductance of the high-voltage switch, the laser chamber, leads of the system and the stripline capacitors has at least a third stripline capacitor included in the pulse-generating network in addition to the first and second stripline capacitors, a series connection of the high-voltage switch and one of the equivalent inductances being connected in parallel with the first stripline capacitor and with a series-parallel circuit formed of the second stripline capacitor and a parallel connection made up of the third stripline capacitor in parallel with an impedance as well as with a series connection of the laser chamber and another of the equivalent inductances.

20 Claims, 15 Drawing Figures

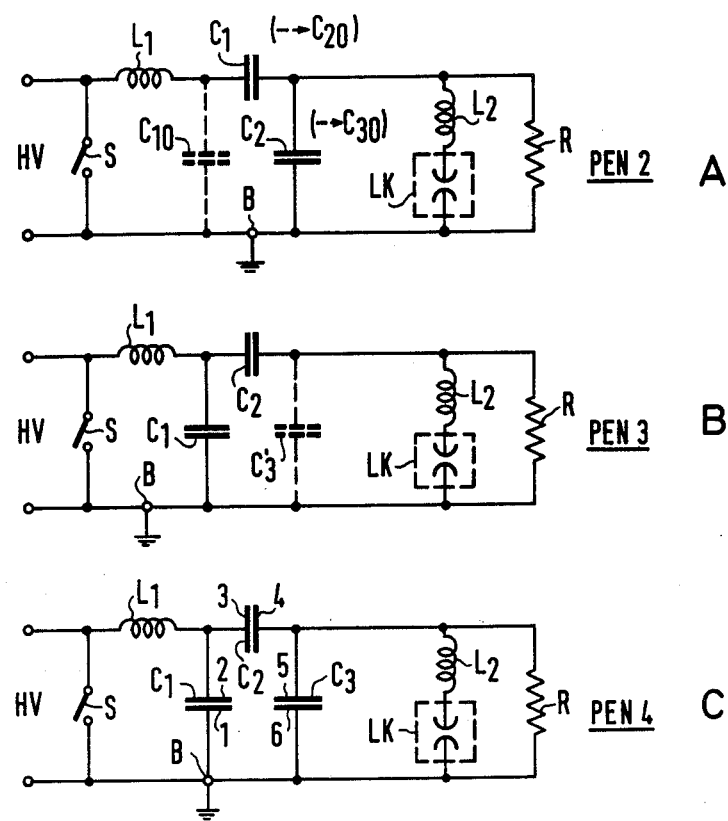
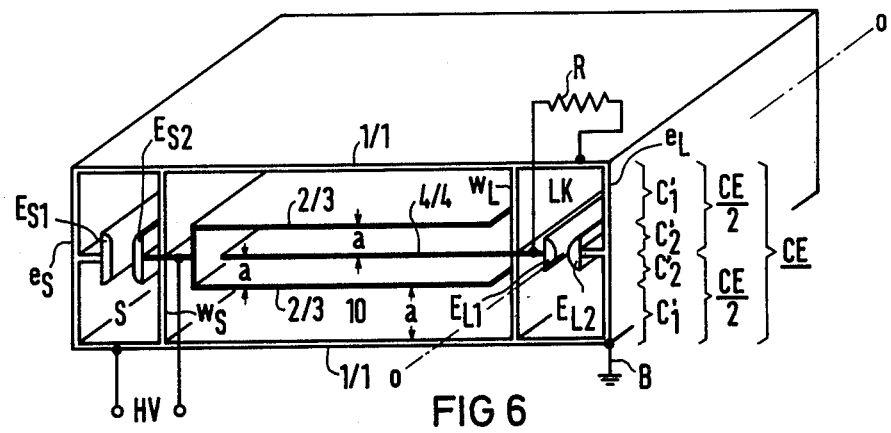
FIG 5
FIG 6

EXCITATION CIRCUIT FOR A TE HIGH-ENERGY LASER SYSTEM

The invention relates to an excitation circuit for a TE high-energy laser system operating with excitation by an arc-free, maximally homogeneous capacitor discharge in a gasfilled space of a laser chamber between at least two mutually spaced-apart laser electrodes disposed opposite one another, the laser electrodes extending parallel to the optical axis of the laser chamber (and preferably being of solid cross section extending in this direction), the TE high-energy laser further including at least one high-speed, high-voltage switch, activatable for energizing a pulse-generating network to generate high-voltage pulses at the laser electrodes; the pulse generating network having first and second stripline capacitors associated with the high-voltage switch and the laser chamber and with appertaining equivalent inductances of the excitation circuit formed from self-inductance of the high-voltage switch, the laser chamber, leads of the system and the stripline capacitors.

Such an excitation system has become known heretofore from German Published Non-Prosecuted Application (DE-OS) No. 29 32 781, except that the circuit diagrams of FIG. 1 for a Blümlein circuit and FIG. 4 for a charge transfer circuit, which are shown therein, do not illustrate equivalent inductances of the excitation circuit, hereinafter identified by $L_1$ and $L_2$.

It is of considerable importance for the invention of the instant application, however, to take these equivalent inductances into account.

For a more explicit explanation of the term TE laser (TE=transversely excited) reference should be made to the aforementioned German published application. Since these TE lasers and TE high-energy lasers, respectively, operate with pressures up to several bar in the laser chamber, it is preferred currently to refer to them as TE lasers and no longer as TEA lasers.

It is presumed herein and hereinafter that high-energy laser systems of the foregoing general type are equipped with pre-ionizers such as are described in German Published Non-Prosecuted Applications (DE-OS) No. 30 35 702 (Surface Discharge) and (DE-OS) No. 30 35 730 (Pre-Ionizing Rods); therefore, no description thereof is believed to be needed within the framework of the present application.

The high-energy or high-powered TE lasers mentioned hereinabove merit increased interest especially because they are suited for use in industrial production. Along with the demand for a high average output of these laser systems, the demand for economy and long life, therefore, comes more and more to the fore.

Of central importance in meeting these criteria is the construction of the pulse generating network (PEN) for the excitation of the lasers. In the pertinent literature, such a pulse-generating network is also called a pulse forming network (PFN).

The characteristic impedance of the pulse generating network mesh containing the load should be designed as low as possible for the highest possible current rise rate in the load. With these measures, which represent the prerequisite for effective laser operation, a laser excitation which is as homogeneous as possible and which affords a favorable adaptation to or matching of the load is aimed at.

To be able to operate the electrical or electronic high-voltage switch of the pulse generating network with great reliability and long service life, for a specified maximum voltage rise time across the load, as high a characteristic impedance as possible in the pulse generating network mesh containing the switching element must be striven for.

It is accordingly an object of the invention to provide an excitation circuit for a TE high-energy laser system of the aforementioned general type which takes the aforementioned requirements into account to the greatest possible extent i.e. has, in particular, the following features: the lowest possible characteristic impedance in the pulse generating network mesh containing the laser discharge gap (load) for the highest possible current rise rate in the load; hence, the most homogeneous excitation of the laser possible, and favorable adaptation to or match of the load; as unstressful an operation of the high-speed, high-voltage switch as possible, with great reliability and long service life, and for this purpose, in particular, at a specified maximum voltage rise time across the load, as high a characteristic impedance as possible in the pulse generating network mesh containing the high-voltage switch (switching element).

With the foregoing and other objects in view, there is provided an excitation circuit for a TE high-energy laser system, operating with excitation by an arc-free, maximally homogeneous capacitor discharge in a gasfilled space of a laser chamber between at least two mutually spaced-apart laser electrodes disposed opposite one another, the laser electrodes extending parallel to the optical axis of the laser chamber, the TE high-energy laser further including at least one high-speed, high-voltage switch, activatable for energizing a pulse-generating network to generate high-voltage pulses at the laser electrodes; the pulse generating network having first and second stripline capacitors associated with the high-voltage switch and the laser chamber and with appertaining equivalent inductances of the excitation circuit formed from self-inductance of the high-voltage switch, the laser chamber, leads of the system and the stripline capacitors, comprising at least a third stripline capacitor included in the pulse-generating network in addition to the first and second stripline capacitors, a series connection of the high-voltage switch and one of the equivalent inductances being connected in parallel with the first stripline capacitor and with a series-parallel circuit formed of the second stripline capacitor and a parallel connection made up of the third stripline capacitor in parallel with an impedance as well as with a series connection of the laser chamber and another of the equivalent inductances, whereby the third stripline capacitor may be considered as having been added to a Blümlein pulse-generating network, in parallel with a series connection of the discharge gap of the laser chamber and an equivalent inductance or may be considered as having been created by adding of a Blümlein type first stripline capacitor to a charge transfer-type pulse-generating circuit, in parallel with a series connection of the high-voltage switch and an equivalent inductance and thereby changing the charge transfer type second stripline capacitor into a ICT-type third stripline capacitor and changing the charge transfer type first stripline capacitor into said Blümlein type second stripline capacitor.

In accordance with another feature of the invention, each of the capacitors is formed of capacitor conductors, and a Blümlein pulse-generating network is provided with a first and a second stripline capacitor and a third stripline capacitor is added by establishing respective capacitor conductors, a first combined capacitor conductor of the second and third stripline capacitor connected to one of the electrodes of the laser chamber; at least a second combined capacitor conductor, respectively, of the first and the second stripline capacitors being spaced from the first combined capacitor conductor opposite and on one side thereof and being connected to one of the electrodes of the high voltage switch; at least a respective third capacitor conductor of the first stripline capacitor being disposed opposite and spaced from the respective second combined capacitor conductor and being connected both to the other of the electrodes of the high voltage switch as well as to the other of the electrodes of the laser chamber; and at least a fourth capacitor conductor of the third stripline capacitor disposed spaced from and directly opposite the first combined capacitor conductor of the the second and third stripline capacitor.

In accordance with a further feature of the invention, each of the capacitors is formed of capacitor conductors, and a Blümlein pulse-generating network is provided with a first and a second stripline capacitor and a third stripline capacitor is added by establishing respective conductors, at least one of a first combined capacitor conductor of the second and third stripline capacitors having a given area and being connected to one of the electrodes of the laser chamber; at least a second combined capacitor conductor, respectively, of the first and the second stripline capacitors being spaced from the first combined capacitor conductor opposite and on both sides thereof and having at least on one side of the first combined capacitor conductor an area smaller than and overlying only part of the given area of the first combined capacitor conductor of the second and third stripline capacitors, and at least a third combined capacitor conductor of the first and third stripline capacitors disposed spaced from and directly opposite and overlying partially the remaining part of the given area of the first combined capacitor conductor at at least one side thereof and overlying partially the remaining area of the second combined capacitor conductor of the first and second stripline capacitors at at least one side thereof.

In accordance with an additional feature of the invention, each of the capacitors is formed of capacitor conductors and a Blümlein pulse-generating network is provided with a first and a second stripline capacitor and a third stripline capacitor is added by establishing respective conductors, a first combined capacitor conductor of the second and third stripline capacitors connected to one of the electrodes of the laser chamber; at least a second combined capacitor conductor, respectively, of the first and the second stripline capacitors being spaced from the first combined capacitor conductor on both sides thereof and being connected to one of the electrodes of the high voltage switch; at least a respective third combined capacitor conductor of the first and third stripline capacitors being disposed opposite and spaced from the respective second combined capacitor conductor and being connected both to the other of the electrodes of the high voltage switch as well as to the other of the electrodes of the laser chamber; at least one of the second combined capacitor conductors, respectively, of the first and the second stripline capacitors being formed with openings of such size that, in the region of the openings, an electric field passes through the openings from area portions of the third combined capacitor conductor of the first and third stripline capacitors, to the first combined capacitor conductor of the said second and third stripline capacitor.

In accordance with again another feature of the invention, there is provided a reducing of the spacing of at least one of the fourth capacitor conductors of the third stripline capacitor with respect to the opposite capacitor conductor thereof for increasing the partial capacitance of the third stripline capacitor.

In accordance with again another feature of the invention, there is provided a reducing of the spacing of at least one of the respective capacitor conductors of the third stripline capacitor with respect to the first combined capacitor conductor of the second and third stripline capacitor for increasing the partial capacitance thereof.

In accordance with again an additional feature of the invention there is provided a reducing of the spacing of at least one of the respective capacitor conductors of the third stripline capacitor with respect to the first combined capacitor conductors of the second and third stripline capacitors, in the projection of the openings, for increasing the partial capacitance of the third stripline capacitor.

In accordance with again a further feature of the invention, each of the stripline capacitors is formed of flat conductors having a dielectric layer therebetween and disposed in a substantially planar arrangement, a longitudinal extension of the laser electrodes and an optical axis thereof extending substantially in the same direction as that of a plane in which the conductors of one of the stripline capacitors are disposed.

In accordance with still another feature of the invention the longitudinal extension of the laser electrodes and the optical axis thereof are substantially coplanar with the conductors of the one stripline capacitor.

In accordance with still a further feature of the invention the longitudinal extension of the laser electrodes and the optical axis thereof are disposed in a plane substantially parallel to the plane in which the conductors of the one stripline capacitor is disposed.

In accordance with still an additional feature of the invention the first and the second stripline capacitors are formed, respectively, of flat capacitor conductors having a dielectric layer therebetween and disposed substantially normally to an optical axis of the laser chamber and stacked to form a capacitor stack substantially parallel to the optical axis, and the first and second stripline capacitors being connected in the pulse generating network, the respective capacitor conductors of the first stripline capacitor and of the second stripline capacitor and respective combined capacitor conductors of the first and the second stripline capacitors being repeatedly disposed alternatingly or cyclically over the length of the stack and, at least in one part of the stack which includes all three of the first, second and third stripline capacitors, at least one of the alternatingly repeated capacitor conductors being at least partly diminished in area from that of the other capacitor conductors.

In accordance with again a further feature of the invention each of the first, second and third stripline capacitors has capacitor conductors in the form of capacitor plates with a liquid dielectric therebetween.

In accordance with yet another feature of the invention the liquid dielectric is selected from the group consisting of water of low conductivity, glycol water mixtures and organic liquids of the N-alkylic acid amide group.

In accordance with yet a further feature of the invention a capacitor conductor at least partly diminished in area is entirely omitted from alternating parts of the stack respectively including all three of the first, second and third stripline capacitors whereby each of the parts of the stack contains a third stripline partial capacitance.

In accordance with yet an additional feature of the invention, the high-voltage switch is a saturable magnetic inductor.

In accordance with again a further feature of the invention, part of the capacitor conductors has a distributed inductance in addition to a circuit of the pulse-generating network, the additional distributed inductance being formed by slotting columns of the capacitor conductors, an additional distributed inductance being thereby formed on the combined capacitor conductors of the first and second stripline capacitors of a capacitor stack and being, at least partly determinative of the third partial capacitance.

In accordance with again an additional feature of the invention part of the capacitor conductors has a distributed inductance in addition to a circuit of the pulse-generating network, the additional distributed inductance being formed by coupling coils bridging gaps between splitted capacitor conductor portions, an additional distributed inductance being thereby formed on the first and second stripline capacitors of a capacitor stack and being at least partly determinative of the third partial capacitance.

In accordance with still a further feature of the invention the equivalent inductance of the third stripline capacitor, which is formed of the sum of self-inductance and terminal inductance, and the equivalent inductance of the series connection of the first and the second stripline capacitors, respectively, are small compared to the equivalent inductance of the excitation circuit branch wherein the laser chamber is connected.

In accordance with yet an additional feature of the invention the equivalent inductances of the third stripline capacitor and of the series connection of the first and the second stripline capacitors are, respectively, smaller by substantially one order of magnitude than the equivalent inductance of the excitation circuit branch wherein the laser branch is connected. In accordance with a concomitant feature of the invention there is provided a thickening of portions of the third combined capacitor conductors in the direction of the opposing first combined capacitor conductor for reducing the spacing with respect to the latter.

Other features which are considered as characteristic for the invention are set forth in the appended claims.

Although the invention is illustrated and described herein as embodied in an excitation circuit for a TE high-energy laser system, it is nevertheless not intended to be limited to the details shows, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 5 is a diagram of three circuits A, B and C of which circuit A is a charge transfer circuit, circuit B a Blümlein circuit, and circuit C an inversion charge transfer circuit according to the invention, a third capacitor and, stripline capacitor respectively, being indicated in broken lines in the diagram of circuits A and B in order to form a circuit like that of circuit C;

Figure 3:
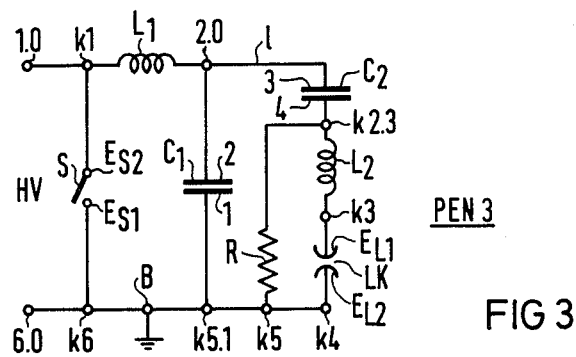
FIG. 3 is a diagram of yet another heretoforeknown excitation circuit with a pulse generating network in the form of an LC inversion circuit also known as a Blümlein circuit.
Figure 7:
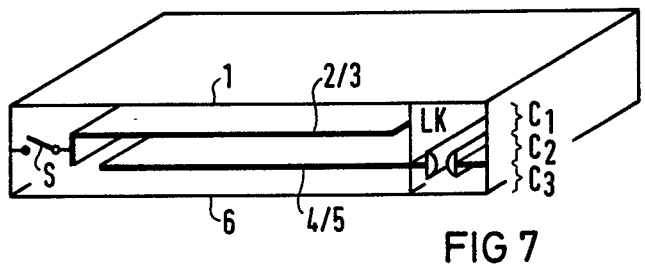
Figure 8:
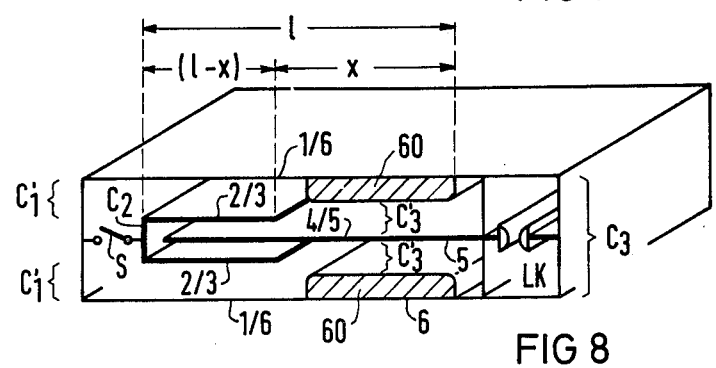
Figure 9:
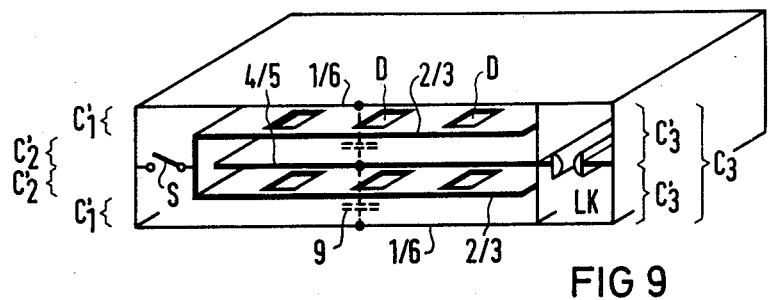
Figure 10:
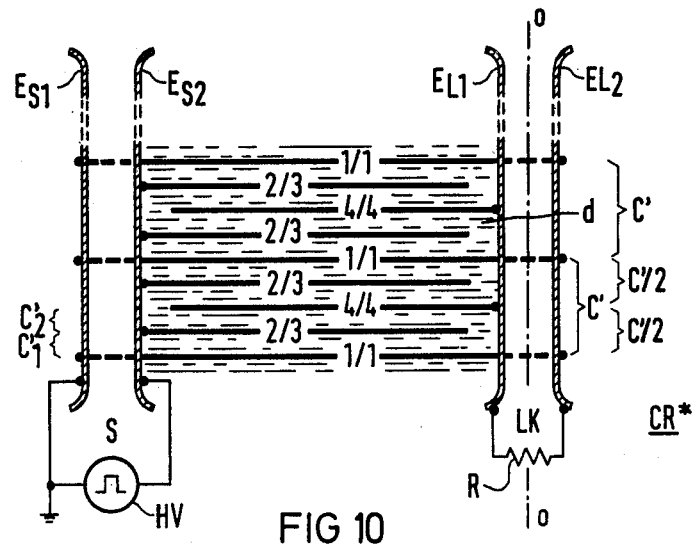
Figure 11:
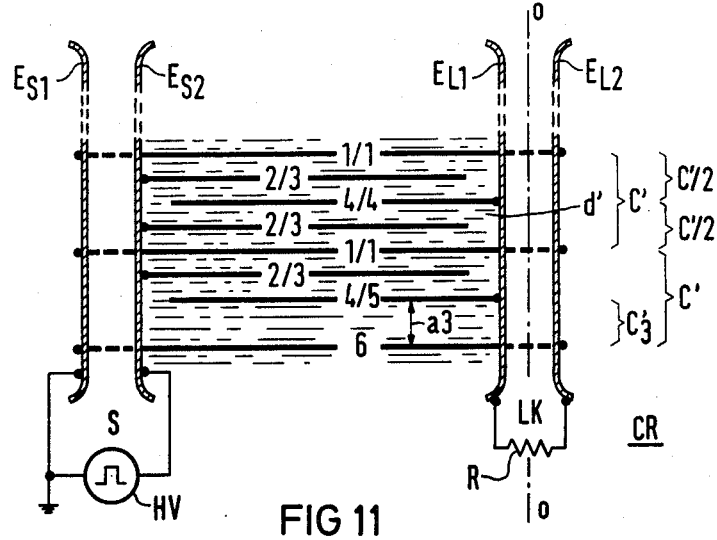
Figure 12:
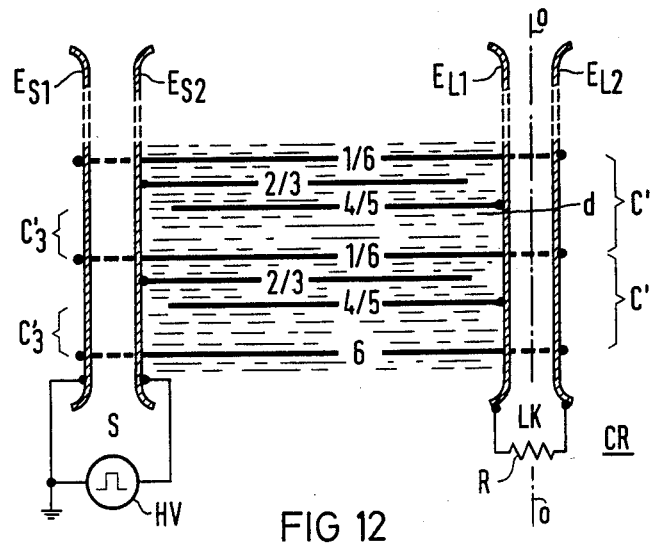
Figure 13:
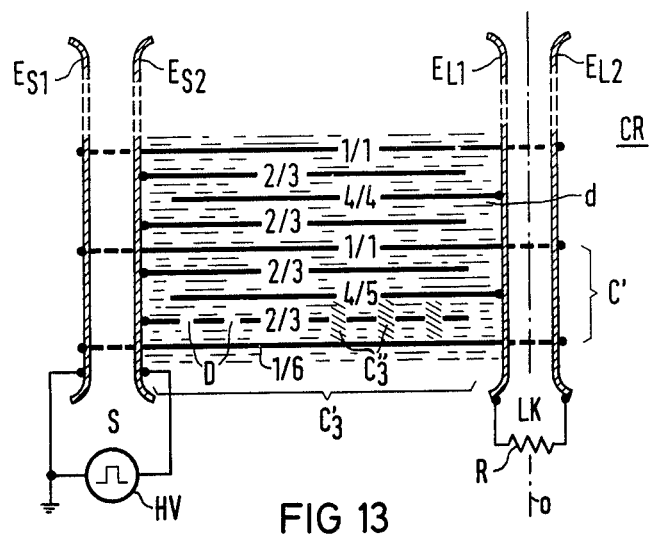
Figure 14:
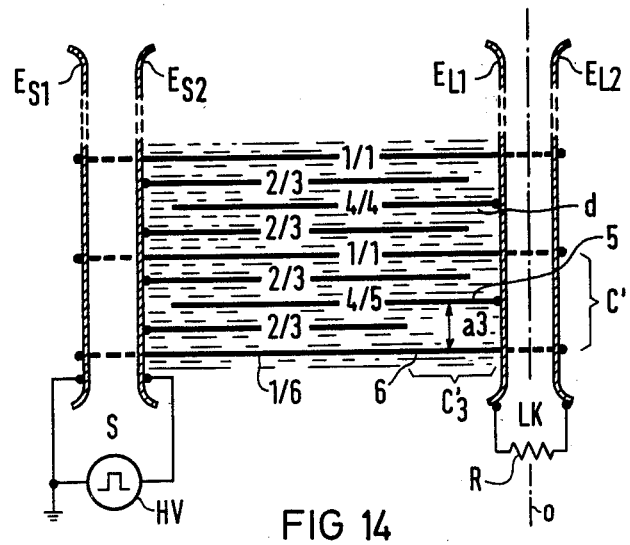
Figure 15:
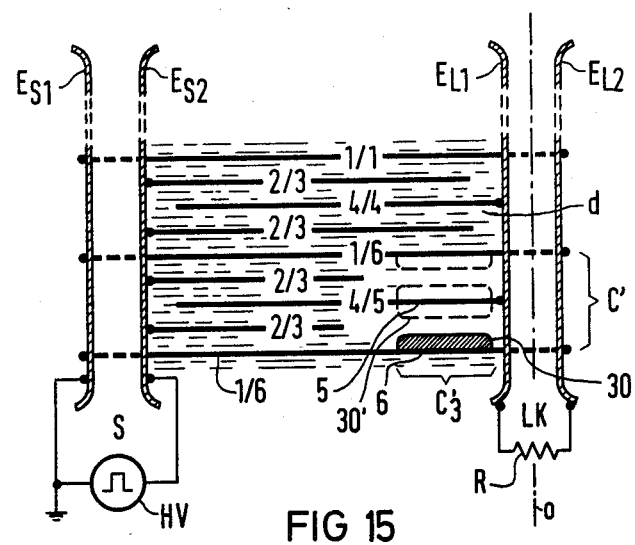

FIG. 6 is a diagrammatic and schematic perspective view of a so-called planar arrangement of the conventional excitation circuit according to FIG. 3 having a laser chamber, a high-voltage switch and conductors or plates of stripline capacitors as well as an impedance R connected in parallel with a laser discharge gap, all of which are joined mechanically and electrically together into a boxshaped unit, one half CE/2 of the total planar capacitor stack CE being an operative entity i. e. containing one each of the conductors 1/1, 2/3 and 4/4;

FIG. 7 is a view like that of FIG. 6 of an improved so-called planar arrangement resulting in a first physical embodiment of the excitation circuit according to the invention wherein, respectively, in comparison with the overall arrangement CE according to FIG. 6, the lower stripline capacitor conductor 2/3 is omitted and, in comparison with only the upper half CE/2 according to FIG. 6, the lower conductor 6 is added;

FIG. 8 is a view like that of FIG. 6 of a second embodiment for the transposition of the excitation circuit according to the invention in a so-called planar arrangement wherein, in comparison with FIG. 6, the conductors 2/3 are shortened, and the partial capacitances $C'_3$ formed thereby between the component or partial conductors 5 and 6, respectively, of the conductors 4/5 and 1/6 can be increased in conductor thickness for the purpose of reducing the spacing between the plates thereof;

FIG. 9 is a view like that of FIG. 6 of a third transposition embodiment according to the invention wherein, in comparison with FIG. 6, the conductors or plates 2/3 are provided with breakthroughs in the form of holes, recesses or slots, through which lines of force can penetrate between the partial conductors 5 and 6 of the conductors 4/5 and 16;

FIG. 10 is a diagrammatic vertical sectional view, partly schematic, of an arrangement of an excitation circuit with an integrated pulse generating network in the form of a Blümlein circuit, as is shown in FIG. 11 of U.S. Pat. No. 4,365,337;

FIG. 11 is a view like that of FIG. 10 of a fourth transposition embodiment of the excitation circuit according to the invention, wherein third partial capacitances $C_3'$ and the partial conductors 5 and 6 thereof according to FIG. 6 can be thought of as having been created by the omission of capacitor conductors or plates 2/3;

FIG. 12 is another view like that of FIG. 10 of a fifth embodiment of a transposition wherein, in comparison with the arrangement of FIG. 11, a part of the capacitor conductors 2/3 is omitted in cyclical order, not only over a partial length, but over the entire stack length of the capacitor stack CR;

FIG. 13 is another view like that of FIG. 10, of a sixth transposition embodiment corresponding to that of FIG. 9, wherein a third partial capacitance $C_3'$ is inserted in at least one stack section of the capacitor stack CR, in fact, by means of defined breakthroughs;

FIG. 14 is another view corresponding to that of FIG. 13, of a seventh embodiment which realizes a third partial capacitance $C_3'$, in fact, by means of shortening the coatings or plates 2/3;

FIG. 15 is another view like that of FIG. 10, of yet another embodiment corresponding to that of FIG. 8 and, in connection with the embodiment of FIG. 14, affords another measure for increasing the capacity of the third partial capacitance by reducing the spacing and thickening the coating, respectively, in a partial area thereof.

Figure 1:
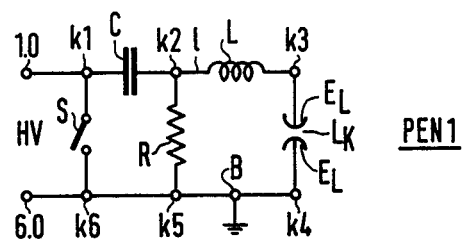
FIG. 1 is a diagram of a simple, heretoforeknown excitation circuit with a laser chamber, a high-voltage switch and a pulse generating network for generating high-voltage pulses for the gas discharge between the laser electrodes of the laser chamber.
Figure 2:
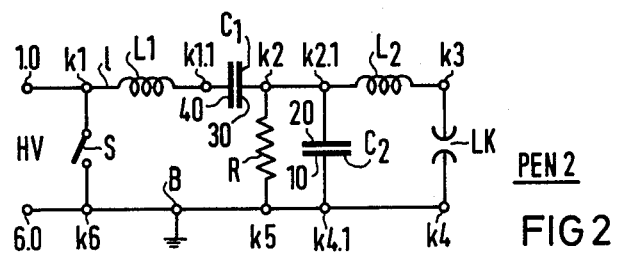
FIG. 2 is a diagram of another heretoforeknown excitation circuit with a pulse generating network in the form of a charge transfer circuit.

Referring now to the drawing and first, particularly, to FIGS. 1 to 3 thereof, there are shown therein three types of circuits which are essentially being used currently for a pulse generating network.

FIG. 1 shows a relatively simple circuit PEN 1, known from German Published Non-Prosecuted Application (DE-OS) No. 20 42 615 and British Pat. No. 1289885. A switch S, connected between terminals 1.0 and 6.0 of a high-voltage supply HV is connected parallel to a series-parallel circuit formed of a capacitor C, on the one hand, and a parallel connection made up of an impedance R parallel to a series connection L - LK, on the other hand. The high-voltage supply HV charges the capacitor C via the impedance R.

A laser chamber with a discharge gap LK of a TE high-energy laser system is provided with two mutually spaced laser electrodes $E_L$ defining the discharge gap LK which is connected in series with the equivalent inductance L and the capacitor C. The impedance R is shunted across the series connection of the inductance L and the discharge gap LK.

Nodal point pairs of the circuit components C, L, LK, R and S are identified by reference characters k1 - k2; k2 - k3; k3 - k4; k2 - k5 and k1 - k6 connected by connecting lines 1. Also shown in FIG. 1 is the mass potential or the appertaining nodal point B. It is noted that, for easier comprehension, the equivalent or leakage inductances are designated herein as discrete, lumped circuit components, although, in reality, they should be imagined as distributed inductances distributed over the laser chamber LK, the capacitors C, the switch S and distributed over the leads. The stray capacitances, on the other hand, are of secondary importance and therefore not shown.

By closing the switch S, the capacitor is connected to the discharge gap LK via the inductance L. Thus, the discharge gap LK and the switch S are connected in series. Therefore, the entire discharge current must flow across the switch S; the insertion of the switch increases the total inductance of the discharge circuit by the switch inductance which is at least in the same order of magnitude as that of the discharge gap. In this circuit, the capacitor charging voltage is the maximum which can appear at the discharge gap. This type of circuit results in several serious disadvantages, especially, if the discharge gap is intended to pump Excimer lasers.

The increased self-inductance of the discharge circuit impairs the excitation efficiency considerably. Moreover, this circuit stresses the switching element to the utmost because the entire discharge current must flow across the switch. Furthermore, if intended for the excitation of high energy lasers, this circuit requires relatively high voltages, the handling of which is associated with extraordinary technical difficulties.

The charge transfer circuit PEN 2, of FIG. 2, which is described in an article by Andrews, Kearsley and Webb in "Optics Communications", Vol. 20, No. 2 (1977) pp 265-268, is widely used. The high-voltage source HV charges a capacitor $C_1$ via the impedance R. A capacitor $C_2$ is charged via an inductance $L_1$ by closing the switch S. The capacitor $C_2$ is discharged across an inductance $L_2$ into the discharge gap LK after the latter is ignited. This circuit offers the advantage that the switch S and the discharge gap LK are located in different meshes of the pulse-generating network; $L_2$, like $L_1$, is an equivalent inductance; identical or logically identical circuit components and nodal points are identified by the same reference characters as in FIG. 1. The nodal point pairs of the circuit components $L_1$, $C_1$, $L_2$, R, $C_2$ are identified by reference characters k1 - k1.1, k1.1 - k2, k2.1 - k3, k2 - k5, and k2.1 - k4.1, respectively. It is obvious that the series connection $L_2$ - LK is connected parallel to $C_2$ and to R, and this series-parallel circuit is connected to the terminal 1.0 in series with the series connection of $L_1$ and $C_1$. The electrodes or conductors 10 and 20 of the second stripline capacitor $C_2$ and the electrodes or conductors 30 and 40 of the first stripline capacitor $C_1$ are shunted across the discharge gap LK.

To be able to transfer to the capacitor $C_2$ the entire energy stored in the capacitor $C_1$ i.e. to attain as good an electrical efficiency as possible, the capacitor $C_1$ must be chosen equal to the capacitor $C_2$. The rate of current rise for the switch is predetermined by the series connection of the capacitors $C_1$ and $C_2$ and the inductance $L_1$, and is determined by the maximally permissible voltage rise time across the electrodes of the discharge gap LK. Because, in this circuit of FIG. 2, the charging voltage is only the maximum that can be applied to the discharge gap LK, one must operate at comparably high voltages as in the initially described circuit type of FIG. 1. It is from this requirement that the high current peaks for the switching element are derived which, however, can be considerably below those of the first circuit.

The LC inversion circuit PEN 3 of FIG. 3, also called a Blümlein circuit, as described by Shipman, "Appl. Phys. Lett." Vol. 10, pp 3-4 (1967), offers the advantage of a low charging voltage which makes considerable technical simplifications possible.

The capacitor $C_1$ is charged by the high-voltage source HV, and the capacitor $C_2$ via the impedance R. After the switch S closes, the capacitor $C_1$ is recharged to the opposite polarity, and the maximum which can be applied to the discharge gap LK is twice the capacitor charging voltage. Via the equivalent inductance $L_2$, the series connection of the capacitors $C_1$ and $C_2$ feeds the discharge burning between the electrodes of the discharge gap LK. The nodal point pairs of the circuit components $L_1$, $C_1$, $C_2$, $L_2$, R are identified by reference characters k1 - k2.0, k2.0 - k5.1, k2.0 - k2.3, k2.3 - k3, and k2.3 - k5, respectively. As in FIG. 2, $C_2$ is the capacitor associated with the laser chamber LK, $C_1$ the capacitor on the side of the switch S, and the capacitor conductors of the two stripline capacitors $C_1$ and $C_2$ are identified by reference characters 1, 2 and 3, 4, respectively.

The peak current of the switching element S in the symmetrical LC inversion circuit according to FIG. 3 i.e. $C_1 = C_2$ for the same voltage rise time across the discharge gap electrodes and for the same energy content of the pulse generating network, is twice that of the charge transfer circuit according to FIG. 2.

On the other hand, the switching element of the charge transfer circuit PEN 2 in comparison with the symmetrical Blümlein circuit PEN 3, must be able to block twice the voltage reliably. Likewise, all other components such as the voltage supply and capacitors, must also be designed for twice the voltage.

Because the Blümlein circuit according to FIG. 3 operates at a relatively low charging voltage, it is particularly well suited for the excitation of high-energy lasers in which high voltages across the electrodes $E_L$ are required in order to pump large-area discharge cross sections.

The requirements demanded of the switching element by the high-energy laser LK are stringent. To reduce the critical values of the current rise rate and peak current, the symmetrical Blümlein circuit i.e. $C_1 < C_2$ described in co-pending application Ser. No. 484,622 of which applicants are co-inventors, is used as pulse generating network for these lasers.

Quite sensibly, the capacitor $C_1$ should not be smaller than 0.5 $C_2$ because, if the symmetry is even greater, the characteristic impedance of the excitation circuit for the discharge gap would increase too much, thereby impairing effective input coupling of energy into the discharge volume. The asymmetrical Blümlein circuit reduces the current load of the switching element almost to values attainable by the charge transfer circuit. The advantage of the higher voltage remains intact, however. To prolong the life of the switching element, the demands on it should be able to be reduced further. The steps to be taken should not lead to a reduction of the excitation effectiveness of the pulse-generating network, however, and especially the characteristic impedance of the excitation circuit should not be increased for a specified energy content and a specified voltage of the pulse generating network.

Figure 4:
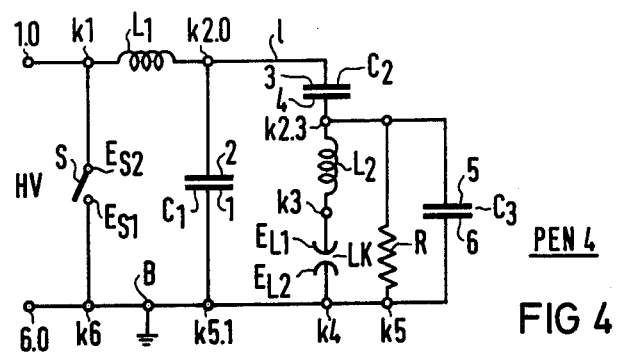
FIG. 4 is a diagram of an excitation circuit constructed in accordance with the invention, with a pulse generating network which could be called an inversion charge transfer circuit.

This problem is solved by the arrangement of an excitation circuit with the pulse-generating network PEN 4 as shown schematically in FIG. 4. It is based upon the LC inversion or Blümlein circuit shown in FIG. 3. An additional capacitor $C_3$ is switched via the discharge gap LK. Advantageously, self-inductance and connected inductance from the series connection of the capacitor $C_1$ and $C_2$, on the one hand, and that of the third stripline capacitor $C_3$, on the other hand, shunted thereacross, are each small, preferably smaller by one order of magnitude, as compared to the equivalent inductance $L_2$ of the excitation branch k2.3 - k4 containing the laser chamber LK. One pole of the capacitor $C_3$ is connected to the nodal points k2.3, the other pole to nodal points k4 and k5, respectively; the capacitor $C_3$ has respective plates or electrode coatings 5 and 6.

The circuit shown in FIG. 4 combines elements of the LC inversion circuit as well as properties of the charge transfer circuit and, therefore, can be characterized as an inversion charge transfer circuit (ICT circuit for short).

The capacitor $C_1$ is charged to charging voltage by the high voltage supply HV, and the capacitor $C_2$ via the impedance R. The capacitor $C_3$ remains nearly at ground potential. After the switch S closes, the charge on the capacitor $C_1$ is reversed. Due to this operation, a voltage builds up across the discharge gap LK, and the capacitor $C_3$ is charged up until the discharge gap LK is ignited.

The series circuit formed of the capacitors $C_1$ and $C_2$ and of the equivalent inductance $L_2$ and, additionally, the parallel circuit made up of the capacitor $C_3$ and the inductance $L_2$ feed the discharge gap LK.

By cleverly selecting the capacitances $C_i$ (i=1, 2, 3), pulse-generating networks PEN 4 can be put together to meet different requirements. Without loss of excitation effectiveness i.e. with approximately the same energy coupled into the discharge gap LK as in the symmetrical Blümlein circuit PEN 3, it is possible to achieve a particularly low-stress operation of the switching element S. For the same voltage rise time the discharge gap LK, and with $$2 < \frac{C_2}{C_1} < 3 \text{ and } C_3 \approx \frac{C_1 \cdot C_2}{C_1 + C_2};$$

the demands on the switching element S are almost cut in half in comparison with the symmetrical Blümlein circuit. If a small loss of energy coupled into the discharge gap can be tolerated, critical data of the switching element S can be reduced even further with $C_1 \leq C_2/4$, if the stored energy, the charging voltage of the pulse generating network PEN 4 and the voltage rise time across the discharge gap are all constant.

If these capacitance ratios $C_i$ are selected, the voltage attainable across the discharge gap LK is below that of the Blümlein circuit, yet above that of the charge transfer circuit. By using the inversion charge transfer circuit, discharge conditions can be set where, in another parameter combination of the capacitances $C_i$, the energy coupled into the discharge gap LK increases in comparison with that of the LC inversion circuit according to FIG. 3.

$$\text{For } 1.5 < \frac{C_2}{C_1} < 2 \text{ and } C_3 \leq 0.5 \times \frac{C_1 \times C_2}{C_1 \times C_2},$$

the energy coupled into the discharge gap LK rises, and the voltage across the discharge gap reaches twice the charging voltage, while the demands on the switching element S are reduced in comparison with the symmetrical Blümlein circuit having $C_1 = C_2$.

The circuit diagrams according to FIGS. 5A, B, C shows that the ICT circuit or the ICT excitation circuit according to the invention (FIG. 5C) can be obtained both by modification of a charge transfer circuit (FIG. 5A) as well as by modification of a Blümlein circuit (FIG. 5B). FIG. 5B shows what has already been explained by way of FIG. 4, namely the insertion of a third stripline capacitor $C_3'$ parallel to the discharge gap of the laser chamber LK and to an equivalent inductance $L_2$ connected in series with the latter, thereby producing the excitation circuit according to the invention (FIG. 5C). Such an excitation circuit, however, is created also by supplementing the charge transfer circuit or the corresponding pulse generating network PEN 2 according to FIG. 5A with an additional third stripline capacitor $C_{10}$ (shown likewise in broken lines as the capacitance $C_3'$ in FIG. 5B). There is indicated in parentheses in FIG. 5A that the originally first stripline capacitor $C_1$ then becomes the second stripline capacitor $C_{20}$, and the second stripline capacitor $C_2$ becomes the third stripline capacitor $C_{30}$ of the ICT circuit, as a comparison with FIG. 5C clearly shows.

The ICT circuit illustrated diagrammatically in FIGS. 4 and 5C can be integrated into the conventional, technically realized excitation circuits or pulse-generating networks. This involves so-called planar arrangements according to FIG. 6, which are called planar because the optical axis o—o of the laser chamber LK and the extent of the laser electrodes $E_{L1}$ and $E_{L2}$ lie in a plane of the electrodes or conductors 1/1, 2/3, 4/4 of the stripline capacitors $C_1$ and $C_2$ or are coplanar to such an electrode plane. Such a so-called planar arrangement has limits from the start as to the number of capacitor electrodes or conductors disposed on top of one another because, due to longer current paths and larger current loops, an increasing number of capacitor conductors results in a no-longer tolerable inductance increase of the overall arrangement.

This problem does not exist in the physical or three-dimensional arrangement, illustrated in principle in FIG. 10 and in which the ICT circuit of the invention can be integrated just as easily as in a so-called planar arrangement. The three-dimensional arrangement of FIG. 10 will be discussed hereinafter; the so-called planar arrangement will initially be discussed. The term "capacitor conductor" in its general meaning here and hereinafter shall comprise a distributed capacitance in the form of a metallic layer, a flat metallic sheet-like conductor, a metallic plate or—especially in case of a solid dielectricum—a metallic coating attached or applied to solid dielectric layers. A distributed capacitance is referred to in the German language as "Kapazitätsbelag", characterized in that it has a certain capacitance per unit length. Similarly, a distributed inductance is referred to in the German language as "Induktivitätsbelag", characterized in that it has a certain inductance per unit length.

Shown in a perspective view in FIG. 6 is a preferred, so-called planar arrangement, identified in its entirety by reference character CE and representing a transposition of the Blümlein circuit according to FIG. 3 into a spatial or physical arrangement. On the right-hand side of FIG. 6 can be seen the laser chamber LK with the two laser electrodes $E_{L1}$ and $E_{L2}$, respectively, extending parallel to the optical axis o—o, the emission direction of the laser, and preferably being of solid cross section extending in this direction and being formed of an electrode part shaped like a mushroom head and a current lead part shaped like a mushroom stem. The laser chamber LK is filled with a suitable laser gas which can be regenerated or replaced by means of a longitudinal and/or transverse gas flow, the gas circulation being non-illustrated. Also provided are suitable pre-ionizing devices such as are described in the aforementioned German Published Non-Prosecuted Applications (DE-OS) No. 30 35 702 and (DE-OS) No. 30 35 730, but not shown herein because they are unnecessary for an understanding of the invention. On the other long side of the boxshaped arrangement CE, there is at least one high-speed, high-voltage switch S, due to the activation or firing of which via the pulse-generating network PEN 3 (note FIG. 3), the high-voltage pulses at the laser electrodes $E_{L1}$ and $E_{L2}$ can be generated. As illustrated in FIG. 6, the high-voltage switch S is a spark gap with electrodes $E_{S1}$ and $E_{S2}$ which also extend axially-parallel to the optical axis o—o and are disposed with a breakdown distance or spacing opposite one another. Instead of a spark gap, electronic switches could also be used such as thyratrons as described in German Published Non-Prosecuted Application (DE-OS) No. 29 32 781. The electrode coatings 1 to 4 of the first and second strip line capacitors $C_1$ and $C_2$ from FIG. 3 are identified in FIG. 6 by reference characters 1/1, 2/3, and 4/4 because, preferably, a compact arrangement with liquid dielectric in which the electrode coatings are formed as capacitor plates is provided in FIG. 6. The distances between the various plates are generally represented by the reference character a; the space 10 filled by the plates and the liquid dielectric is separated from the laser chamber LK by the insulating partition $w_L$ on the laser side and from the chamber of the switch S by the insulating partition $w_S$ on the switch side.

These partitions $w_L$ and $w_S$ are penetrated gastightly by the laser electrode $E_{L1}$ and the switch electrode $E_{S2}$, respectively, serving simultaneously as supports for these electrodes; the respective opposite electrodes $E_{L2}$ of the laser chamber and $E_{S1}$ of the switch S are connected to ground potential at B via the upper and lower ground plate 1/1 and the vertical metallic wall parts $e_S$ on the switch side and $e_L$ on the laser side, the latter wall parts $e_L$ and $e_S$ extending vertically in FIG. 6 and serving simultaneously as supports for the electrodes $E_{L2}$ and $E_{S1}$, respectively, as current leads, and as a termination of the metallic housing jacket 1/1 - $e_L$-1/1 - $e_S$ which acts as a shield. The impedance R, connected parallel to the laser discharge gap, taking into account a possible equivalent inductance $L_2$, is connected to the laser electrode $E_{L1}$, on the one hand, and to the ground plate 1/1, on the other hand (note FIG. 3); the high voltage HV is applied between 1/1, on the one hand, and the switch electrode $E_{S2}$, on the other hand.

The arrangement according to FIG. 6 is approximately symmetrical, due to which a compact construction completely shielded from the outside is attainable; accordingly, the overall arrangement CE is formed of two partial or component arrangements CE/2 which, in turn, respectively, have a first and a second partial capacitor $C_1'$ and $C_2'$ each, the partial capacitor $C_1'$ being formed by the mutually opposing plates 1/1 and 2/3, and the partial capacitor $C_2'$ by the mutually opposing plates 2/3 and 4/4. It is readily apparent that the plates 2/3 and 4/4 are double-acting or utilized twice. Starting from FIG. 6, a first transposition variation according to FIG. 7 for forming or integrating the third stripline capacitor $C_3$, is obtained by omitting one of the two plates 2/3 of FIG. 6, in the case at hand, the lower plate 2/3 of FIG. 6, so that the conductors 4/5 and 6 are directly opposite each other in the lower part of FIG. 7 wherein the omission of the plate 2/3 has occurred. The identification of the lower ground plate 1/1 has thus been changed to 6 and that of the middle plate 4/4 to 4/5 in order to express thereby that the two conductors 5 and 6 of the third stripline capacitor of the ICT circuit according to FIG. 4 and FIG. 5C, respectively, have come about due to the transposition. The reference character 4/5 is intended to express that these plates or this capacitor conductors is a double-acting capacitor conductor because it belongs to both the third stripline capacitor $C_3$ with the capacitor conductors 5 and 6 and to the second stripline capacitor $C_2$ with the capacitor conductors 2/3 and 4. The transposition carried out in the arrangement according to FIG. 7 can also be realized by starting from one half of the arrangement according to FIG. 6, wherein thus, the lower half, which includes the plates 2/3 and 1/1 is missing, and by closing the box, which is thus open at the bottom thereof, as it were, by adding a plate 6.

In a second transposition variant according to FIG. 8, the integration of the third stripline capacitor $C_3$ into an arrangement according to FIG. 6 is realized in both plates 2/3 (or both capacitor conductors 2/3 in an arrangement with a solid dielectric) by shortening the ends thereof extending away from the high-voltage switch S by a distance X so that only the length l-x remains for the plates 2/3, and the partial capacitor conductors 5 and 6 of the plates 4/5 and 1/6 are disposed directly opposite one another at the location of the distance x by which the plates 2/3 were shortened. The capacitance of the third stripline capacitor $C_3$ can be increased further by reducing the spacing between the partial electrode coatings 5 and 6 by providing thicker coatings 60, as shown diagrammatically in FIG. 8. The partial capacitors of the stripline capacitors are again identified by reference characters $C_1'$, $C_2'$, and $C_3'$.

In a third transposition variation or embodiment for the integration of a third stripline capacitor $C_3$ according to FIG. 9, the two capacitor conductors 2/3, in comparison with those of FIG. 6, are provided with breakthroughs D in the form of holes, cutouts, or slots of such size that, in the breakthrough region, a direct field penetration can occur through the breakthroughs D from the capacitor conductor 1/6 to the capacitor conductor 4/5. As is explained more explicitly hereinbelow, this results in an advantageous possible embodiment for both the arrangement and the dimensions and layout of these breakthroughs; the area thereof can be made so large as to contribute to the formation of the third stripline capacitor $C_3$ and, in addition, they can be so formed as to provide meander or loop-shaped current paths within the plates or electrode coatings for the formation of delay lines, it being possible to employ both measures in combination or only one of them.

The four basic transition possibilities for the integration of a third stripline capacitor as explained with respect to FIGS. 7 to 9 can be applied singly or separately, or also in combination i.e. also in sub-combination. In this regard, the shortening, breakthrough or thickening measures may be employed not only symmetrically i.e. for both of the plates 2/3 to the same extent, but also, an asymmetrical realization is also possible. The thickening of conductor portions is a preferred embodiment of the reducing of the spacing of opposing correlated conductor portions in order to increase the capacitance thereof.

FIGS. 7 to 9 in conjunction with FIG. 6 represent preferred planar arrangements with a liquid dielectric and capacitor plates; the dielectric used, besides water of low conductivity, also glycol/water mixtures, respectively, at variable temperatures and having different water fractions or contents; organic liquids of the N-alkylic acid amide group are also suitable as dielectric. Moreover, arrangements corresponding to those of FIGS. 7 to 9 can also be realized with a solid dielectric and as solid capacitor arrangements and corresponding capacitor conductors, respectively, as has already been indicated.

To better understand the further transposition variations for the integration of a third stripline capacitor based upon the three-dimensional or spatial arrangements according to FIGS. 11 through 15, the three-dimensional arrangement according to FIG. 10, which corresponds to a transposition of the Blümlein circuit according to FIG. 3 in a spatial arrangement will be discussed initially. This has previously been described in German Published Non-Prosecuted Application (DE-OS) No. 29 32 781, wherein it is illustrated in FIG. 11 as a compact plate arrangement which a liquid dielectric. Basically, however, the invention is also applicable to stripline capacitor arrangements with solid dielectric and capacitor conductors (solid capacitors), as shown, for example, in FIGS. 2 and 3 of the last-mentioned German published application. It is a characteristic of the three-dimensional arrangement according to FIG. 10 that the plates 4/4, 2/3, 1/1, and the dielectric layers d located therebetween, of the first and second stripline capacitors $C_1$ and $C_2$ are disposed substantially normal to the optical axis o—o of the laser chamber LK and stacked substantially parallel to the optical axis to form a capacitor stack CR* and connected within the pulse generating network PEN 3. Due to this construction, a relatively low inductance is formed despite a very high total capacitance to be realized. The entire capacitor arrangement CE shown in FIG. 6 corresponds to partial stack C' in FIG. 10; the component arrangement CE/2 in FIG. 6 corresponds to the half partial stack C'/2 in FIG. 10. C'/2 and CE/2, respectively, are the smallest, yet functional stripline capacitor arrangements which contain once all capacitor conductors and plates 1, 2, 3, 4, and 1/1, 2/3, 4/4, respectively. In FIG. 10, the capacitor plates or conductors are identified in a manner corresponding to that of FIG. 6, as are also the other circuit components of the excitation circuit. Essentially, the embodiment according to FIG. 10 is arrived at from that of FIG. 6 by turning the capacitor plates 90° about an axis of rotation which is imagined to be transverse to the optical axis o—o, and then increasing the number of partial stacks as needed.

The transposition variations explained in relation to FIGS. 6 through 9 are correspondingly applicable also to the three-dimensional arrangement according to FIG. 10 in order, in this manner, to integrate the third stripline capacitor $C_3$ according to FIGS. 4 and 5C, respectively, into the pulse generating network. For a better understanding, nevertheless, some selected transposition variations are illustrated in FIGS. 11 through 15.

With respect to the variation or specific embodiment according to FIG. 11, for the insertion of the third strip line capacitor $C_3$ into the pulse-generating network PEN 3 according to FIG. 3, of the conductors 1/1 of the first stripline capacitor, the conductors 4/4 of the second stripline capacitor and the conductors 2/3 of the first and second stripline capacitors, which conductors repeat cyclically over the stack length, at least one plate is omitted in at least one of the capacitor stacks C' containing all of the conductors once and in one plate pair (or coating pair) 2/3, 2/3. In this manner, a partial capacitor $C_3'$ is produced across the laser chamber LK i.e. between the capacitor plates connected to the laser electrodes $E_{L1}$ and $E_{L2}$ originally identified by reference characters 4/4 and 1/1, but now identified by reference characters 4/5 and 6. The value of the capacitor $C_3$ of the entire stack CR results from the addition of all of the partial capacitors $C_3'$, if the measure of omitting the plate 2/3 is taken not only at one, but at least at another point over the length of the capacitor stack CR. The capacity of one of the partial capacitors $C_3'$ is adjustable through the distance a3 and through the smallest of the areas of the capacitor plates 6 and 4/5. The designation 4/5 serves to indicate that this plate belongs to both the partial capacitor $C_2'$ and the partial capacitor $C_3'$, while the designation of the second plate of the partial capacitor $C_3'$ as 6 indicates that this plate belongs to the capacitor conductor identified by reference numeral 6 in FIGS. 4 and 5C, respectively. The total capacitance $C_3$ can be adapted to the circuit requirements by varying the capacitances $C_3'$ and by varying the number of partial stacks C' of the capacitor stack CR containing a partial capacitor $C_3'$.

FIG. 12 shows a different transposition embodiment in which each partial capacitor stack C' contains a third stripline partial capacitor $C_3'$ which, however, is not necessary for the proper functioning of the circuit according to FIGS. 4 and 5C. The plates associated only with the partial capacitor $C_3'$ are again identified by reference numeral 6, the plate belonging to both the second partial capacitor $C_2'$ and the third partial capacitor $C_3'$ is identified by reference character 4/5, the plate belonging to both the first and second partial capacitors $C_1'$ and $C_2'$ is identified by reference character 2/3, and the plate belonging to both the first and third partial capacitors $C_1'$ and $C_3'$ by reference character 1/6. The total capacitor $C_1$ of the ICT circuit according to FIGS. 4 and 5C is formed in its entirety of the partial capacitors $C_1'$ with the plates 2/3 and 1/6, the total capacitor $C_2$ in its entirety of the partial capacitors $C_3'$ with the plates 4/5 and 2/3. The suitable values of these capacitors, as given based upon the circuit requirements, are adjustable in accordance with the hereinaforementioned co-pending application Ser. No. 484,622.

Spark gaps and thyratrons are again suited as switching elements for the three-dimensional arrangements according to FIGS. 11 and 12 as well as according to FIGS. 16A to 19B yet to be discussed hereinafter; special advantages result, however, from coupling a magnetic inductor, such as is described in co-pending application Ser. No. 546,899, filed Oct. 31, 1983, to the pulse-generating network PEN 4 shown in FIGS. 4 and 5C.

In the further embodiment shown in FIG. 13 for the insertion or integration of a capacitance $C_3$, which extends across the discharge gap of the laser chamber LK, into the pulse generating network PEN 4 of an ICT circuit, the partial stack C' again has a partial capacitor $C_1'$ with the plates 2/3 and 1/1 and a partial capacitor $C_2'$ with the plates 4/4 and 2/3. Therein, however, some or all of the plates 2/3 are provided with breakthroughs D (holes, recesses, cutouts or the like) to reduce the effective surface of the plates 2/3, thereby reducing, on the one hand, the capacitance values of $C_1'$ and $C_2'$ and, on the other hand, the capacitance values $C_1$ and $C_2$, respectively. But then electrical field components are present between the plates 4/5 and 1/6 (indicated by shading in FIG. 13), which reach through the plates 2/3 and cause small partial capacitances $C_3''$ to be formed parallel to the discharge gap LK. The small partial capacitances $C_3''$ combine, per partial stack C', into partial capacitors $C_3'$ and the latter combine, in turn, additively into the total or entire capacitor $C_3$ depending upon the frequency or repetition of the arrangement in the pulse-generating network.

This embodiment has the advantage, which is also present in the embodiment according to FIG. 9, that, if necessary, all of the plates 2/3 can remain in the stack capacitor so that the connected inductance with respect to the laser chamber LK remains minimal. Another advantage of this embodiment is that, to avoid high peak currents in the switching element S in the case of the pulses being formed by delay lines, such a pulse formation can also be combined very simply in the circuit and the corresponding mesh, respectively, containing the switch S, as described in co-pending application Ser. No. 484,621, filed Apr. 13, 1983, with the introduction of the capacitor $C_3$ across the laser chamber LK. All this requires is to make the joints or parting lines mentioned therein and the cuts or incisions described in German Published Non-Prosecuted Application (DE-OS) No. 31 28 206, respectively, so wide or deep as to account for a sizable part of the total area of the plates 2/3 and so that the aforementioned field penetration from the plate 1/6 through the plates 2/3 to the plates 4/5 takes place.

In the different embodiment shown in FIG. 14 for the insertion of the capacitor $C_3$, some or all of the plates 2/3 are made shorter so that, up to a selectable lateral distance from the laser chamber LK, only the partial plates 5 of the plates 4/5 and the partial plates 1/6 are still opposite one another, thus forming a partial capacitor $C_3'$ having a value, in accordance with the known laws of electrical engineering, which results from the area not covered by the plate 2/3, the spacing a3 of the plates 1/6 and 4/5 from one another, and the dielectrics used.

In the version shown in FIG. 15, the embodiment according to FIG. 14 is modified in that an increase of the value of $C_3'$ and $C_3$, respectively, is made possible by partially reducing the spacing of the plates 1/6 and 4/5 (moving the partial plates 5 and 6 closer). This is accomplished by providing thickenings 30, 30', shown partly in broken lines in FIG. 15, on the partial plates 5 and 6 i.e. in the surface areas which were formed by shortening the plates 2/3. If this value increase of $C_3'$, and $C_3$, respectively, is not needed, the shortening of the plates 2/3 may be less, due to thickened electrode coating 30 and/or 30' for a given value for the capacitor $C_3$, thus permitting a higher value for the capacitor $C_1$.

Also, the two last-mentioned embodiments of FIGS. 14 and 15 permit all of the plates 2/3 to be left in the stack in favor of minimizing the connected inductance.

The foregoing is a description corresponding in substance to German Application No. P 33 23 614.3, dated June 30, 1983, the International priority of which is being claimed for the instant application, and which is hereby made part of this application. Any material discrepancies between the foregoing specification and the aforementioned corresponding German application are to be resolved in favor of the latter.

We claim:

1. Excitation circuit for a TE high-energy laser system, operating with excitation by an arc free, maximally homogeneous capacitor discharge in a gasfilled space of a laser chamber between at least two mutually spaced-apart laser electrodes disposed opposite one another, the laser electrodes extending parallel to the optical axis of the laser chamber, the TE high-energy laser further including at least one high-speed, high-voltage switch, activatable for energizing a pulse-generating network to generate high-voltage pulses at the laser electrodes; the pulse generating network having first and second stripline capacitors associated with the high-voltage switch and the laser chamber and with appertaining equivalent inductances of the excitation circuit formed from self-inductance of the high-voltage switch, the laser chamber, leads of the system and the stripline capacitors, comprising at least a third stripline capacitor included in the pulse-generating network in addition to the first and second stripline capacitors, a series connection of the high-voltage switch and one of the equivalent inductances being connected in parallel with the first stripline capacitor and with a series-parallel circuit formed of the second stripline capacitor and a parallel connection made up of said third stripline capacitor in parallel with an impedance as well as with a series connection of the laser chamber and another of the equivalent inductances, whereby said third stripline capacitor may be considered as having been added to a Blümlein pulse-generating network, in parallel with a series connection of the discharge gap of the laser chamber and an equivalent inductance or may be considered as having been created by adding of a Blümlein type first stripline capacitor to a charge transfer-type pulse-generating circuit, in parallel with a series connection of the high-voltage switch and an equivalent inductance and thereby changing the charge transfer type second stripline capacitor into a ICT-type third stripline capacitor and changing the charge transfer type first stripline capacitor into said Blümlein type second stripline capacitor.

2. Excitation circuit according to claim 1 wherein each of the capacitors is formed of capacitor conductors, and a Blümlein pulse-generating network is provided with a first and a second stripline capacitor and a third stripline capacitor is added by establishing respective capacitor conductors, a first combined capacitor conductor of the second and third stripline capacitor connected to one of the electrodes of the laser chamber; at least a second combined capacitor conductor, respectively, of the first and the second stripline capacitors being spaced from said first combined capacitor conductor opposite and on one side thereof and being connected to one of the electrodes of the high voltage switch; at least a respective third capacitor conductor of the first stripline capacitor being disposed opposite and spaced from the respective second combined capacitor conductor and being connected both to the other of the electrodes of the high voltage switch as well as to the other of the electrodes of the laser chamber; and at least a fourth capacitor conductor of said third stripline capacitor disposed spaced from and directly opposite said first combined capacitor conductor of the said second and third stripline capacitor.

3. Excitation circuit according to claim 2 including a reducing of the spacing of at least one of said fourth capacitor conductors of said third stripline capacitor with respect to the opposite capacitor conductor thereof for increasing the partial capacitance of said third stripline capacitor.

4. Excitation circuit according to claim 3 wherein part of the capacitor conductors has a distributed inductance in addition to a circuit of the pulse-generating network, the additional distributed inductance being formed by slotting columns of the capacitor conductors, an additional distributed inductance being thereby formed on the combined capacitor conductors of the first and second stripline capacitors of a capacitor stack and being, at least partly determinative of said third partial capacitance.

5. Excitation circuit according to claim 3, including a thickening of portions of the third combined capacitor conductors in the direction of the opposing first combined capacitor conductor for reducing the spacing with respect to the latter.

6. Excitation circuit according to claim 1 wherein each of the capacitors is formed of capacitor conductors, and a Blümlein pulse-generating network is provided with a first and a second stripline capacitor and a third stripline capacitor is added by establishing respective conductors, at least one of a first combined capacitor conductor of the second and third stripline capacitors having a given area and being connected to one of the electrodes of the laser chamber; at least a second combined capacitor conductor, respectively, of the first and the second stripline capacitors being spaced from said first combined capacitor conductor opposite and on both sides thereof and having at least on one side of said first combined capacitor conductor an area smaller than and overlying only part of said given area of said first combined capacitor conductor of the second and third stripline capacitors, and at least a third combined capacitor conductor of said first and third stripline capacitors disposed spaced from and directly opposite and overlying partially the remaining part of said given area of said first combined capacitor conductor at at least one side thereof and overlying partially the remaining area of said second combined capacitor conductor of said first and second stripline capacitors at at least one side thereof.

7. Excitation circuit according to claim 6 including a reducing of the spacing of at least one of the respective capacitor conductors of said third stripline capacitor with respect to said first combined capacitor conductor of said second and third stripline capacitor for increasing the partial capacitance thereof.

8. Excitation circuit according to claim 1 wherein each of the capacitors is formed of capacitor conductors and a Blümlein pulse-generating network is provided with a first and a second stripline capacitor and a third stripline capacitor is added by establishing respective conductors, a first combined capacitor conductor of the second and third stripline capacitors connected to one of the electrodes of the laser chamber; at least a second combined capacitor conductor, respectively, of the first and the second stripline capacitors being spaced from said first combined capacitor conductor on both sides thereof and being connected to one of the electrodes of the high voltage switch; at least a respective third combined capacitor conductor of the first and third stripline capacitors being disposed opposite and spaced from the respective second combined capacitor conductor and being connected both to the other of the electrodes of the high voltage switch as well as to the other of the electrodes of the laser chamber; at least one of said second combined capacitor conductors, respectively, of the first and the second stripline capacitors being formed with openings of such size that, in the region of said openings, an electric field passes through said openings from area portions of said third combined capacitor conductor of said first and third stripline capacitors, to said first combined capacitor conductor of the said second and third stripline capacitor.

9. Excitation circuit according to claim 8 including a reducing of the spacing of at least one of the respective capacitor conductors of said third stripline capacitor with respect to said first combined capacitor conductors of said second and third stripline capacitors, in the projection of said openings, for increasing the partial capacitance of the third stripline capacitor.

10. Excitation circuit according to claim 1 wherein each of said stripline capacitors is formed of flat conductors having a dielectric layer therebetween and disposed in a substantially planar arrangement, a longitudinal extension of the laser electrodes and an optical axis thereof extending substantially in the same direction as that of a plane in which the conductors of one of the stripline capacitors are disposed.

11. Excitation circuit according to claim 10 wherein said longitudinal extension of the laser electrodes and said optical axis thereof are substantially coplanar with the conductors of the one stripline capacitor.

12. Excitation circuit according to claim 10 wherein said longitudinal extension of the laser electrodes and said optical axis thereof are disposed in a plane substantially parallel to the plane in which the conductors of the one stripline capacitor is disposed.

13. Excitation circuit according to claim 1 wherein the first and the second stripline capacitors are formed, respectively, of flat capacitor conductors having a dielectric layer therebetween and disposed substantially normally to an optical axis of the laser chamber and stacked to form a capacitor stack substantially parallel to said optical axis, and the first and second stripline capacitors being connected in the pulse generating network, the respective capacitor conductors of the first stripline capacitor and of the second stripline capacitor and respective combined capacitor conductors of the first and the second stripline capacitors being repeatedly disposed alternatingly or cyclically over the length of the stack and, at least in one part of the stack which includes all three of the first, second and third stripline capacitors, at least one of said alternatingly repeated capacitor conductors being at least partly diminished in area from that of the other capacitor conductors.

14. Excitation circuit according to claim 13 wherein said capacitor conductor at least partly diminished in area is entirely omitted from alternating parts of the stack respectively including all three of the first, second and third stripline capacitors whereby each of said parts of the stack contains a third stripline partial capacitance.

15. Excitation circuit according to claim 14 wherein part of the capacitor conductors has a distributed inductance in addition to a circuit of the pulse-generating network, the additional distributed inductance being formed by coupling coils bridging gaps between splitted capacitor conductor portions, an additional distributed inductance being thereby formed on the first and second stripline capacitors of a capacitor stack and being at least partly determinative of said third partial capacitance.

16. Excitation circuit according to claim 1 wherein each of the first, second and third stripline capacitors has capacitor conductors in the form of capacitor plates with a liquid dielectric therebetween.

17. Excitation circuit according to claim 16 wherein said liquid dielectric is selected from the group consisting of water of low conductivity, glycol water mixtures and organic liquids of the N-alkylic acid amide group.

18. Excitation circuit according to claim 1 wherein the high-voltage switch is a saturatable magnetic inductor.

19. Excitation circuit according to claim 1 wherein the equivalent inductance of the third stripline capacitor, which is formed of the sum of self-inductance and terminal inductance, and the equivalent inductance of the series connection of the first and the second stripline capacitors, respectively, are small compared to the equivalent inductance of the excitation circuit branch wherein the laser chamber is connected.

20. Excitation circuit according to claim 19 wherein the equivalent inductances of the third stripline capacitor and of the series connection of the first and the second stripline capacitors are, respectively, smaller by substantially one order of magnitude than the equivalent inductance of the excitation circuit branch wherein the laser branch is connected.

* * * * *